US010967981B2

(12) United States Patent
Hughes et al.

(10) Patent No.: US 10,967,981 B2
(45) Date of Patent: Apr. 6, 2021

(54) HYBRID AIRCRAFT WITH TRANSVERSELY ORIENTED ENGINE

(71) Applicant: Textron Aviation Inc., Wichita, KS (US)

(72) Inventors: Mark Alan Hughes, Towanda, KS (US); Neal Herbert Willford, Andover, KS (US)

(73) Assignee: Textron Innovations, Inc., Providence, RI (US)

( * ) Notice: Subject to any disclaimer, the term of this patent is extended or adjusted under 35 U.S.C. 154(b) by 592 days.

(21) Appl. No.: 15/667,929

(22) Filed: Aug. 3, 2017

(65) Prior Publication Data

US 2018/0037332 A1 Feb. 8, 2018

Related U.S. Application Data

(60) Provisional application No. 62/371,560, filed on Aug. 5, 2016.

(51) Int. Cl.
*B64D 27/24* (2006.01)
*B64F 5/00* (2017.01)
(Continued)

(52) U.S. Cl.
CPC .............. *B64D 27/24* (2013.01); *B64F 5/00* (2013.01); *F01D 15/08* (2013.01); *F01D 15/10* (2013.01); *F02B 63/04* (2013.01); *F02C 6/206* (2013.01); *B64C 11/00* (2013.01); *B64D 2027/026* (2013.01); *F05D 2220/32* (2013.01); *F05D 2220/76* (2013.01)

(58) Field of Classification Search
CPC .................................. B64D 27/24; B64F 5/00
See application file for complete search history.

(56) References Cited

U.S. PATENT DOCUMENTS

| 4,605,185 | A | * | 8/1986 | Reyes | ..................... | B64D 27/24 |
| | | | | | | 244/55 |
| 2012/0234968 | A1 | * | 9/2012 | Smith | ..................... | B64D 17/64 |
| | | | | | | 244/12.3 |

(Continued)

FOREIGN PATENT DOCUMENTS

| EP | 3369655 A1 | 5/2018 |
| EP | 3431385 A1 | 1/2019 |
| EP | 3434592 A1 | 1/2019 |

OTHER PUBLICATIONS

PCT Patent Application PCT/US2017/045269 International Search Report and Written Opinion dated Oct. 26, 2017.

(Continued)

*Primary Examiner* — Justin M Benedik
(74) *Attorney, Agent, or Firm* — Erise IP, P.A.

(57) ABSTRACT

A propulsion system for an aircraft includes an engine (e.g., piston engine, or turbine) having an axis made to be non-parallel with the longitudinal axis of the aircraft. This is enabled using an electrical, hydraulic, or other system to transfer energy generated by the engine (e.g., via electrical wiring, fluid conduits, etc.) to remotely power a motor used to drive a thrust-creating device (e.g., propeller or ducted fan). That the engine is able to be freely oriented allows for it being positioned without regard to any mechanical restraints existing in conventional arrangements.

21 Claims, 4 Drawing Sheets

(51) Int. Cl.
*F01D 15/10* (2006.01)
*F02B 63/04* (2006.01)
*F01D 15/08* (2006.01)
*F02C 6/20* (2006.01)
B64D 27/02 (2006.01)
B64C 11/00 (2006.01)

(56) References Cited

U.S. PATENT DOCUMENTS

| | | |
|---|---|---|
| 2012/0292441 A1 | 11/2012 | Drela et al. |
| 2013/0062463 A1* | 3/2013 | Lord ................ F02C 6/206 244/55 |
| 2013/0082135 A1 | 4/2013 | Moret |
| 2013/0183169 A1* | 7/2013 | Buono .................. B64C 27/10 417/212 |
| 2013/0227950 A1 | 9/2013 | Anderson et al. |
| 2014/0217231 A1* | 8/2014 | Pantalone, III ......... B64C 27/82 244/17.21 |
| 2015/0151844 A1* | 6/2015 | Anton .................. B64C 31/024 244/55 |
| 2015/0151884 A1 | 6/2015 | Anton et al. |

OTHER PUBLICATIONS

European Patent Application 17837673.7 European Search Report dated Mar. 11, 2020.

\* cited by examiner

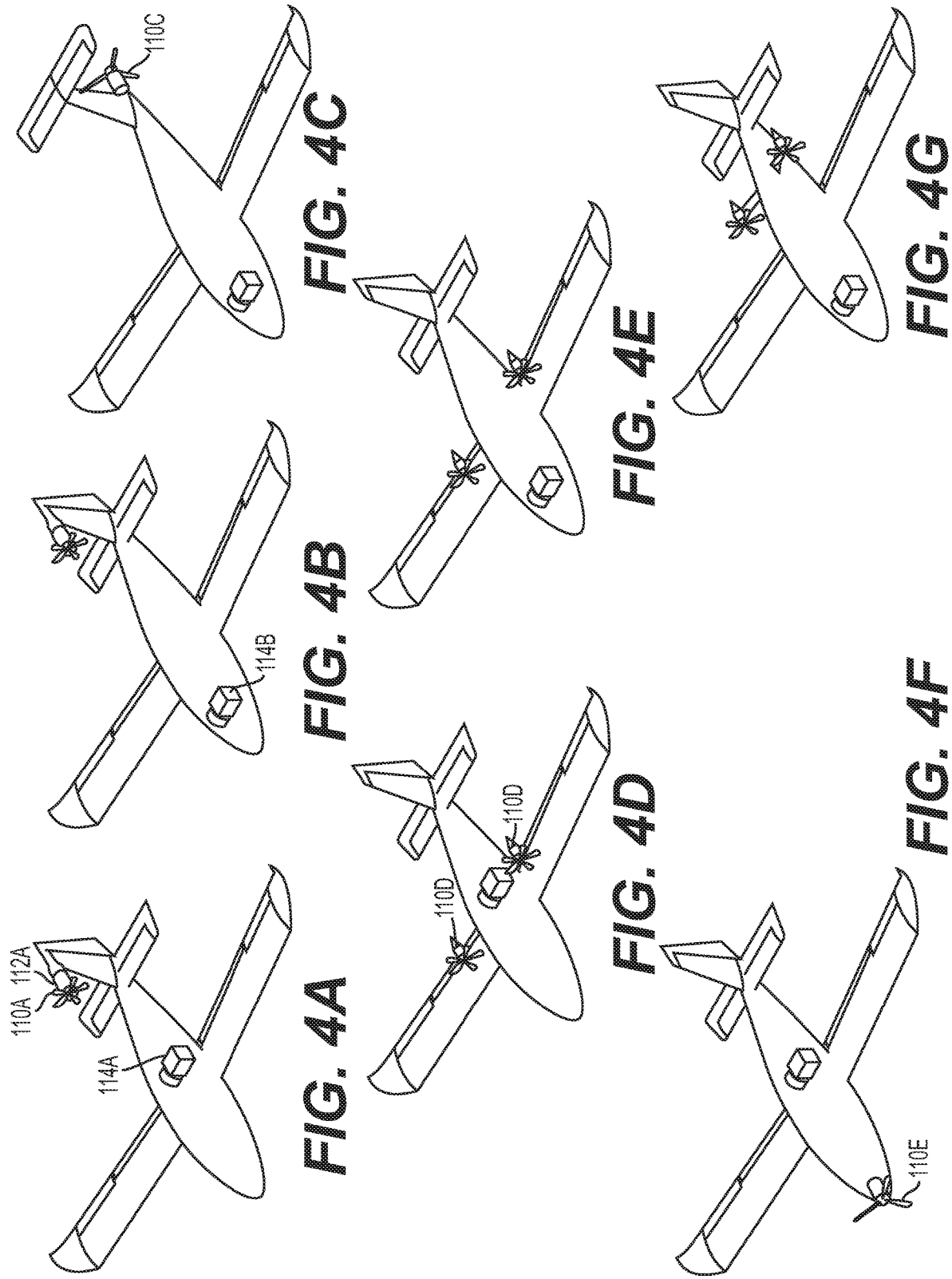

HYBRID AIRCRAFT WITH TRANSVERSELY ORIENTED ENGINE

CROSS-REFERENCE TO RELATED APPLICATIONS

This application claims the benefit of U.S. Provisional Patent Application No. 62/371,560 filed Aug. 5, 2016, the entire contents of which are hereby incorporated by reference.

BACKGROUND OF THE INVENTION

1. Field of the Invention

The invention relates generally to the field of powering aircraft. More specifically, the invention relates to the incorporation of hybrid engine technologies into aircraft.

2. Description of the Related Art

The most common aircraft using propellers, ducted fans, or other means for providing thrust to the aircraft are powered using some form of fuel-consuming engine. Piston engines or turbines are used quite a bit depending on which is the most desirable for a given application. Regardless of the engine used, combustion of the fuel is used to rotate a shaft. A propeller (or ducted fan, or some other sort of thruster) is mounted on or coupled with the shaft. A direct mechanical coupling between the propeller and the engine exists in the conventional arrangements. Thus, each propeller is located directly in front of (or behind in some reverse fan arrangements) the engine so the rotation can be shared on the same rotating mechanical system. For example, a propeller mounted on the front of a single engine aircraft is mounted directly behind the engine. Where the aircraft uses two propellers—one on each wing—each will have a designated engine, each supplying the rotation needed to drive the craft. Thus, the engines are mounted on the wings directly behind the propellers. The same sort of arrangement is employed in this fashion regardless of the number of propellers used.

SUMMARY

In embodiments, a system is disclosed for an aircraft, where the aircraft has a fuselage having a longitudinal axis, a seating area in the fuselage having first and second laterally-extending wings, a first thrust-creating device having a first rotational axis, and a fuel-consuming engine having a rotating shaft, and the shaft has a center axis. The system has an energy-conversion device configured to receive the rotating shaft and create a transmittable form of converted energy; a first energy-receiving device configured to rotate the first thrust-creating device using the form of converted energy to propel the aircraft; and the center axis of the shaft is laterally nonparallel relative to the longitudinal axis.

In some embodiments, the energy-conversion device is a generator, and the form of converted energy is electrical power. In some embodiments, the generator is one of a: (i) Permanent Magnet Synchronous Machine (PMSM) generator; (ii) a Hybrid Excitation Synchronous Machine (HESM) generator; (iii) a Field Excited Synchronous Generator (FESG); and, (iv) an Induction Generator (IG). In yet other embodiments, the engine and the energy-conversion device are located in the fuselage, and more specifically, can be located either in front of or behind the seating area. Further, the engine and the energy-conversion device can be located at least partially underneath at least one seat in the seating area.

The first energy-receiving device, in an embodiment, is an electric motor which powers the first thrust-creating device using the electrical power. Alternatively, the energy-conversion device can be a pump, and the form of converted energy is a driven fluid. Where the pump arrangement exists, the first energy-receiving device can be a hydraulic motor which powers the first thrust-creating device using the driven fluid.

The engine can be either a turbine or a piston engine. Where the first thrust-creating device is located on a first wing, the system can also include a second thrust-creating device having a second rotational axis, the second thrust-creating device being located on a second wing opposite the first wing; and a second energy-receiving device configured to rotate the second thrust-creating device using the form of converted energy.

In some embodiments, the center axis of the engine is substantially normal to both the first rotational axis of the first thrust-creating device, and the second rotational axis of the second thrust-creating device. Further, the converted energy can be used to independently drive the first and second thrust-creating devices.

In some versions, the rotating shaft of the engine is substantially displaced relative to each of the first and second thrust-creating devices. Additionally, the first and second thrust-creating devices can be extended away from one of a fuselage and a wing of the aircraft on a support. In embodiments, the thrust-creating device is one of a propeller and a ducted fan.

In other embodiments, a system is described for an aircraft where the aircraft. A fuel-consuming engine configured to rotate a shaft, the center axis of the shaft being transverse relative to a longitudinal axis of the aircraft, and a generator is mechanically linked to the shaft. An electrical-delivery circuit is configured to receive power output from the generator and deliver the power output to a remotely-located electrical motor. The motor is mechanically connected to a thruster oriented to propel the aircraft. In embodiments, the center axis of the engine is substantially perpendicular relative to the longitudinal axis of the aircraft.

A method of equipping an aircraft is also disclosed. More specifically, the method includes the steps of: (i) installing an engine at a first location in the aircraft such that an axle of the engine is nonparallel relative to a longitudinal axis of the aircraft; (ii) providing a thrust-creating device at a remote, second location, the thrust creating device establishing a rotational axis; (iii) positioning and installing the thrust-creating device such that the rotational axis is substantially parallel to a longitudinal axis of the aircraft; and (iv) connecting an energy output of the engine to a motor mechanically coupled to the thrust-creating device to power the thrust-creating device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIGS. 4A-G are drawings showing numerous configurations for an aircraft in which the disclosed systems are incorporated.

DETAILED DESCRIPTION

Embodiments of the present invention provide systems and a method for establishing a hybrid system in an aircraft in which the engine does not have to be mechanically linked to the propellers (or other thrust-creating devices on the aircraft). Because of this, the orientation of the rotational axis of the engine is freed from conventional arrangements having an engine orientation and/or a drive shaft that runs parallel with the flight path of the aircraft. The systems herein enable the engines, drive shafts, and generator arrangements to run transverse to a longitudinal axis of the aircraft. The term "transverse" as used in this application should be interpreted as meaning that the thing is angled relative to another thing. Another way of saying this is that the two things are not parallel. Unless otherwise specified, this term (transverse) should not be interpreted as meaning perpendicular, or even substantially perpendicular.

The systems herein, because a mechanical connection is not required, enable the engine and generator arrangements to be located remotely from the thrust-creating device or devices (e.g., propellers, ducted fans, or other rotating propulsive devices). The terms "thrust device" or "thruster" as used herein mean any device used to, upon the receipt of energy, create a propulsive force.

Figure 1:
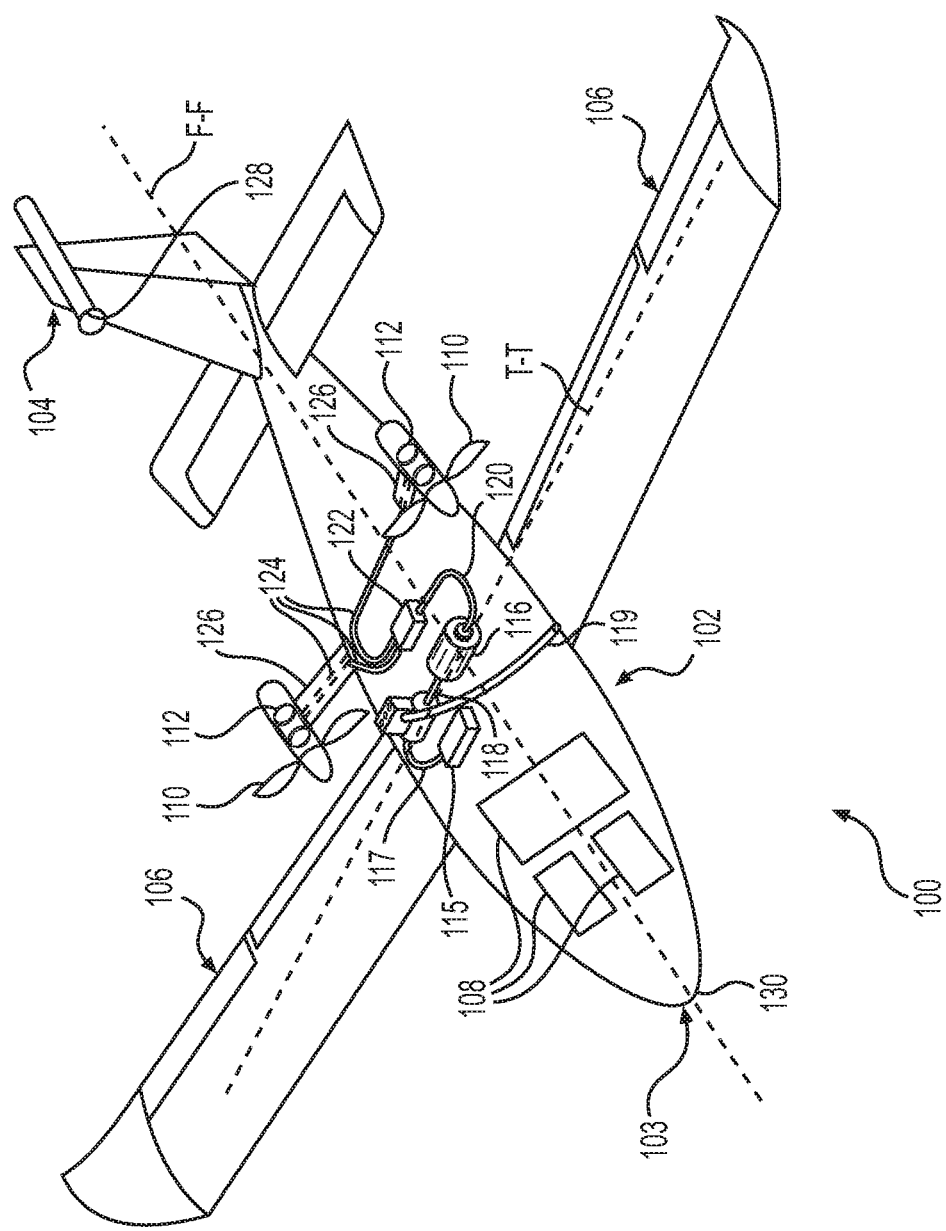
FIG. 1 is a perspective view of an aircraft in which the power-administering equipment is revealed.

Referring first to FIG. 1, it can be seen that an aircraft 100 has a fuselage portion 102, a forward-most position on the aircraft, e.g., a nosecone 103, a tail 104, and wings 106.

Internally, aircraft 100 includes a plurality of seats 108 for the pilot (or pilots) as well as passengers. In the disclosed embodiment in FIG. 1, propellers 110 are mounted on the portion of the fuselage slightly behind and above the wings 106. It will become evident that numerous other arrangements are made possible by the systems disclosed herein.

The systems of aircraft 100 include a hybrid power system for driving the propellers 110. With the hybrid system, the propellers 110 are driven using electric motors 112. The electric motors 112, in the disclosed embodiment receive electrical power from a power generation system located on board the aircraft 100. More specifically, the system incorporates a piston engine 114 which receives fuel (e.g., gasoline or other petrol) from a fuel tank 115, vaporizes the fuel with air, combusts the mix, and then exhausts the combusted products through a duct 119 which extends from the engine exhaust manifold to a port formed in the aircraft skin to release into the environment.

Although engine 114 in the FIG. 1 embodiment is shown to be a piston engine, those skilled in the art will recognize that other sorts of engines, e.g., gas turbines, rotary, or other kinds of engines could be used as well. Thus, the invention should not be limited to any sort of engine unless otherwise stated. The piston engine drives a generator 116 using a mechanical connection. The generator 116 is used to convert the mechanical energy existing in the drive shaft of the piston engine into electrical energy which will be used to drive the propeller (or propellers). In the disclosed embodiment, a Permanent Magnet Synchronous Machine (PMSM) generator is used to generate electricity. Alternatively, however, other kinds of generators, e.g., Hybrid Excitation Synchronous Machine (HESM) generators, Field Excited Synchronous Generators (FESG), an Induction Generator (IG), other numerous other kinds of AC or DC devices/generators capable of converting mechanical energy into electricity could be used for power creation.

Figure 2:
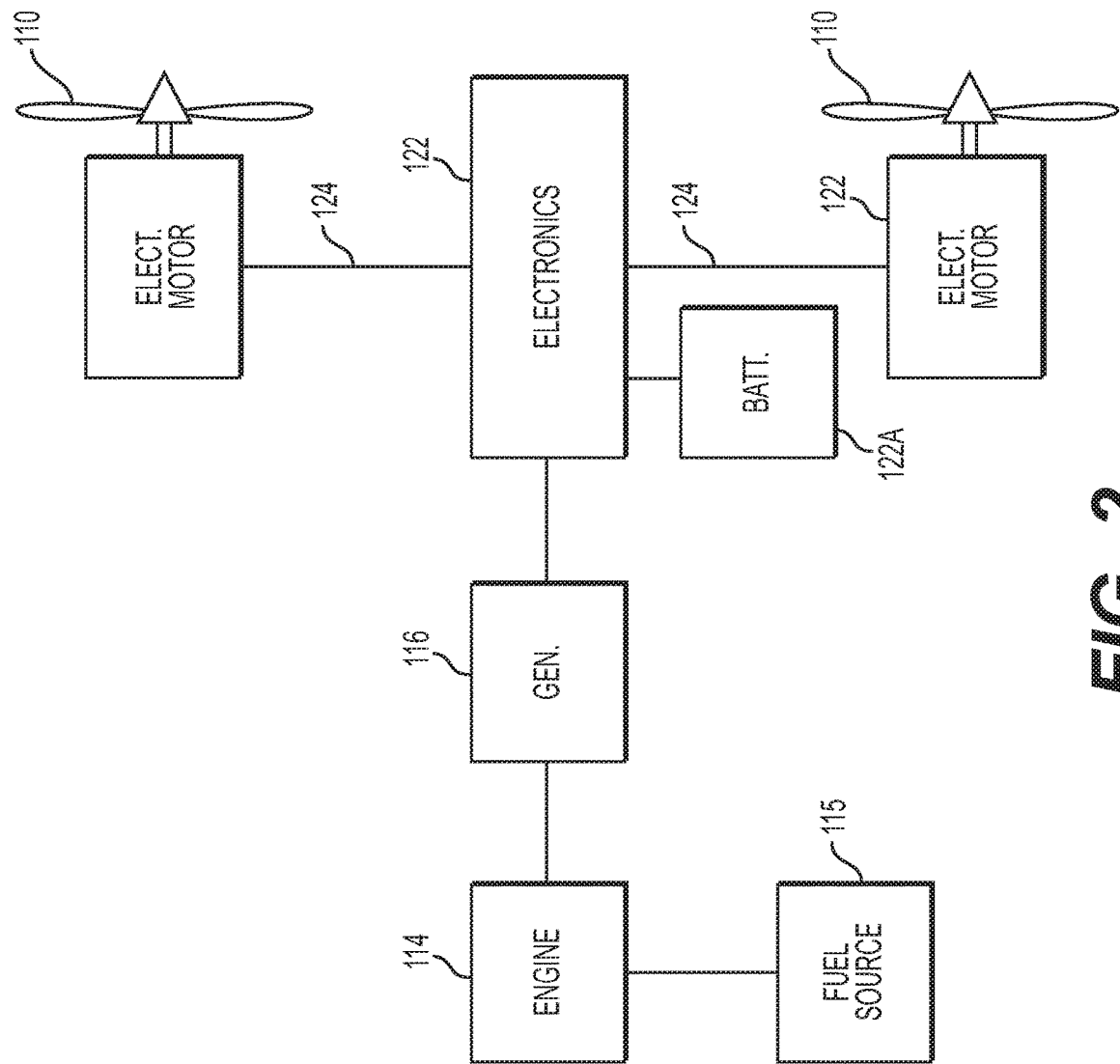
FIG. 2 is a system diagram showing one embodiment for the components incorporated.

The power generated is communicated to an electronics box 122 via an electrical connection 120. A schematic representation of the system is shown in FIG. 2, which shows the incorporation of a battery 122a with the electronics box 122. The electrical connection 120 in the disclosed embodiment can be copper or other wiring of an appropriate gage capable of handling the current generated.

In the electronics box 122, the electrical power encounters a charger (not shown) which is used to maintain a charge of the battery 122a. Battery 122a may be coupled with a capacitor (not shown) for the purpose of allowing for quicker delivery of power. Additionally, or alternatively, a flywheel (not shown) may be used in cooperation with or instead of the capacitor and/or battery to enable more immediate power when needed than is afforded by the typical battery.

The power available from these devices is then converted back into AC (by a converter or inverter) to drive the electric motors 112, which are electrically connected through an electrical connection 124. Although the disclosure above incorporates the use of an AC motor for the purpose of driving each propeller, it should also be noted that a DC motor could be used alternatively. This would involve the use of different electrical equipment within the electronics box 122, e.g., you would not need a converter/inverter.

Figure 3:
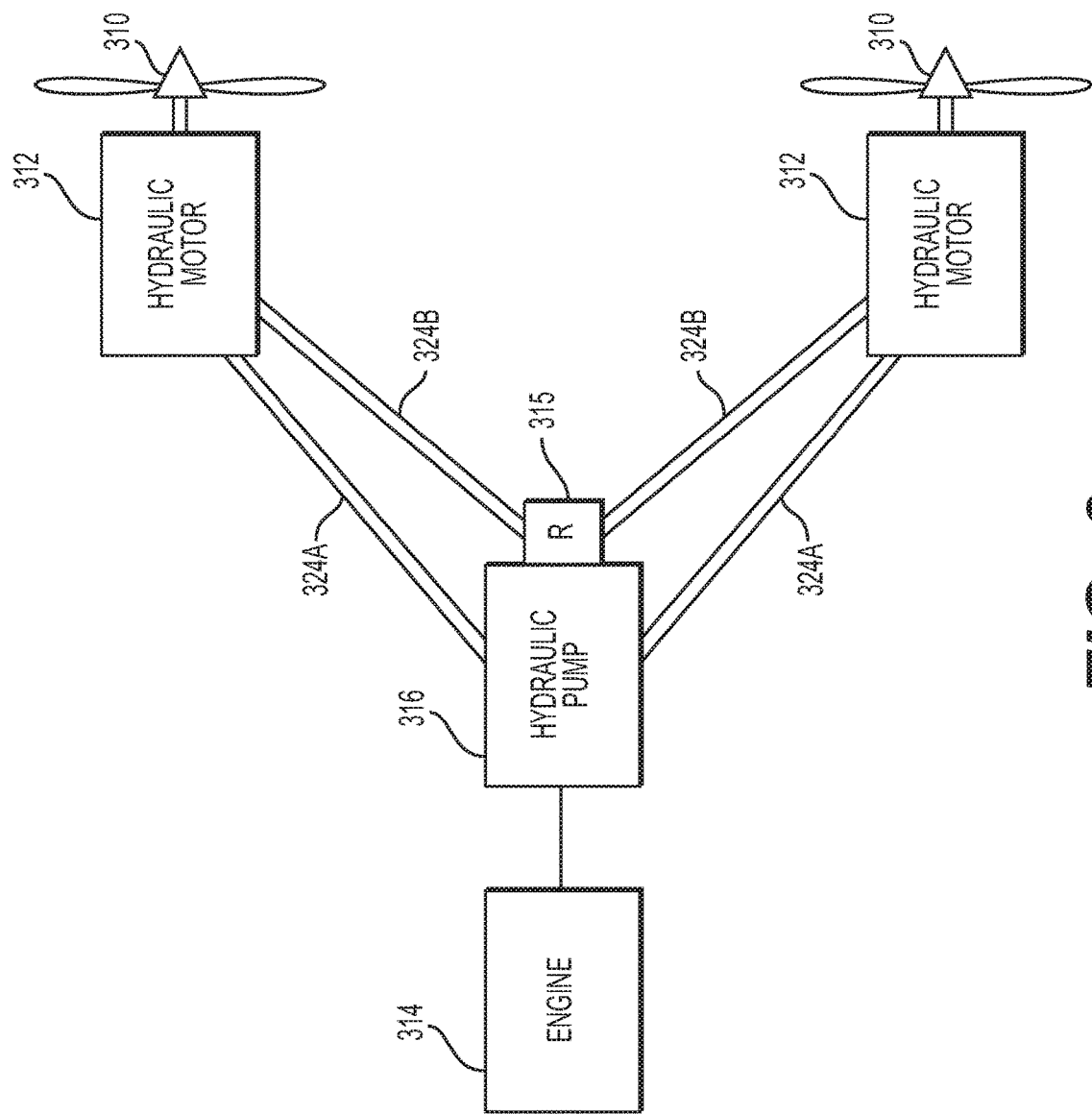
FIG. 3 shows a system diagram for an alternative hydraulically-powered embodiment.

FIG. 3 shows an alternative hydraulic arrangement. In this arrangement, the generator 116 of FIG. 1 has been replaced with a hydraulic pump 316 to create a flow of a fluid medium, e.g., hydraulic fluid, through at least one high-pressure transmission line, e.g., lines 324a. Two lines 324a are shown in FIG. 3. Transmission lines 324a each cooperate with a return line (lines 324b shown in the figure) to operate each of the hydraulic motors 312 (which have been substituted for the electric motors in FIGS. 1-2). Motors 312 each drive one of two thrusting devices (propellers 310). Thus, the hydraulic transmission and return lines 324a and 324b (normally hoses or other conduits) are in a sense a substitution for the electrical lines 124 of FIGS. 1 and 2. The hydraulically-driven motors 312 each receive high pressure fluid via the transmission lines 324a, convert it to mechanical energy to turn the thrust-creating devices/propellers 310, and return the fluid (at relatively low pressure) back to a reservoir 315 for recirculation by the hydraulic pump 316. Thus, a hydraulic system could be used instead of the electrical one discussed already to enable the remote powering of the propellers using a common pump. Or alternatively, two pumps could be used (not shown), each one dedicated to, but remotely located from, each hydraulic motor.

The electric motors 112 and propellers 110 are, in the FIG. 1 embodiment, extended up and out relative to the fuselage 102 using twin structural engine supports 126.

It should be noted, however, that the propeller positions shown in the arrangement of FIG. 1 are only one of numerous possibilities. For example, the two propellers could be replaced or supplemented with a propeller located at a position 128 facing forward from the tail of the aircraft. Alternatively, the two propellers could be replaced or supplemented with a propeller located at the front of the aircraft at a location 130. It should also be noted that any combination of fuselage, tail, or nose mounted motor/propeller combinations could be made. Some examples of this are shown in FIGS. 4A-H, but the arrangements shown are only examples, and no particular propeller location, or combination of locations should be considered limiting unless otherwise specified in the claims.

Where conventional aircraft systems include arrangements where a piston (or other sort of) engine is located at and dedicated to each propeller. This requires a mechanical driving connection (e.g., using a shaft and possibly gears) between each engine and each propeller. With the power system disclosed herein, the need for this sort of mechanical connection (or link) to the propellers, as well as the need for proximal location is eliminated.

Additionally, the removal of a requirement for a mechanical dynamic connection between the engine and the propeller (or propellers) allows the engine 114 to be positioned in an unconventional manner. Conventionally aircraft engines have been oriented so that the drive shaft of the engines is parallel with the longitudinal axis of the fuselage (in FIG. 1 depicted as axis F-F) which is also parallel to the flight path of the aircraft.

The removal of the mechanical-connection requirement enables great freedom in positioning the engine—both in location, and in angular orientation. For example, the engine can be moved to numerous locations completely independently from the intended propeller positions (see, e.g., FIGS. 4A-H). It should be understood, that although the primary embodiment (FIG. 1) disclosed shows an engine having a rotational axis that is perpendicular to the rotational axis of the propellers, that it is also possible to maintain the rotational axis of the engine in parallel with the rotational axis of the one or more propellers.

But in other embodiments, and as can also be seen from FIG. 1, however, the engine 114, drive shaft 118, and generator 116 used for power generation in the aircraft 100 are all oriented in an axis T-T which is axially transverse relative to the longitudinal (roll) axis F-F (which also substantially represents the line of travel for the aircraft in flight). Axis F-F is also substantially parallel with the axis for each propeller rotational axis. This layout enables the following advantages including e.g., alternative seating arrangements, center of gravity improvements, etc.

It is also significant that a single engine can be used to power a plurality of propellers. Thus, the propellers can be located completely independent from the need to create a mechanical link between the drive mechanisms of the engine with the propellers. Only the electric motors need to be located at the propellers, and the electronic motors are significantly smaller and lighter than the conventional piston or other engines used to power the propellers.

Similarly, although all of the depicted embodiments show the use of motors being located immediately at the locations of the propellers, it is entirely possible for the actual electronic motor to be in a position away from the propeller, but linked by mechanical drive mechanisms (e.g., gears and shafts). Further, although all of the propellers shown in the disclosed embodiments a dedicated electric motor coupled with each individual propeller, it is contemplated that alternative arrangements where a single electric motor is provided for a plurality of propellers, which could be achieved via mechanical coupling.

Combination of Features (A1) A system for an aircraft, the aircraft having a roll axis, a seating area in the fuselage having first and second laterally-extending wings, a first thrust-creating device having a first rotational axis, and a fuel-consuming engine creating rotation into an engine shaft, the system comprising: an energy-conversion device configured to receive the rotating engine shaft and create a transmittable form of converted energy; a first energy-receiving device configured to rotate the first thrust-creating device in an axis of rotation using the form of converted energy to propel the aircraft; and, an axis of the engine shaft being nonparallel relative to the first rotational axis of the first thrust-creating device.

(A2) In the system denoted as (A1), wherein the energy-conversion device is a generator, and the form of converted energy is electrical power.

(A3) In either of the systems denoted as (A1) or (A2) wherein the generator is one of a: (i) Permanent Magnet Synchronous Machine (PMSM) generator; (ii) a Hybrid Excitation Synchronous Machine (HESM) generator; (iii) a Field Excited Synchronous Generator (FESG); and, (iv) an Induction Generator (IG).

(A4) In any of the systems denoted as (A1) through (A3) wherein the engine and the energy-conversion device are located in the fuselage.

(A5) In any of the systems denoted as (A1) through (A4) wherein the engine and the energy-conversion device are located behind the seating area.

(A6) In any of the systems denoted as (A1) through (A4) wherein the engine and the energy-conversion device are located in front of the seating area.

(A7) In any of the systems denoted as (A1) through (A6) wherein one of the engine and the energy-conversion device is located at least partially underneath at least one seat in the seating area.

(A8) In any of the systems denoted as (A1) through (A7) wherein the first energy-receiving device is an electric motor which powers the first thrust-creating device using the electrical power.

(A9) In any of the systems denoted as (A1) through (A7) wherein the energy-conversion device is a pump, and the form of converted energy is a driven fluid.

(A10) In any of the systems denoted as (A1) through (A7) or (A9) wherein the first energy-receiving device is a hydraulic motor which powers the first thrust-creating device using the driven fluid.

(A11) In any of the systems denoted as (A1) through (A10) wherein the engine is piston-driven.

(A12) In any of the systems denoted as (A1) through (A10) wherein the engine is a turbine.

(A13) In any of the systems denoted as (A1) through (A12) wherein the first thrust-creating device is located on a first wing, the system further comprising: a second thrust-creating device having a second rotational axis, the second thrust-creating device being located on a second wing opposite the first wing; and, a second energy-receiving device configured to rotate the second thrust-creating device using the form of converted energy.

(A14) In any of the systems denoted as (A1) through (A13) wherein the engine shaft is substantially normal to both the first rotational axis of the first thrust-creating device, and the second rotational axis of the second thrust-creating device.

(A15) In any of the systems denoted as (A1) through (A14) wherein the form of converted energy is used to independently drive each of the first thrust-creating device, and a second thrust-creating device.

(A16) In any of the systems denoted as (A1) through (A15) wherein the engine shaft is substantially displaced relative to each of the first and second thrust-creating devices.

(A17) In any of the systems denoted as (A1) through (A16) wherein at least one of the first and second thrust-creating devices are extended away from one of a fuselage and a wing of the aircraft on a support.

(A18) In any of the systems denoted as (A1) through (A17) where the thrust-creating device is one of a propeller and a ducted fan.

(B1) A system for an aircraft, the aircraft having a roll axis, the system comprising: a fuel-consuming engine configured to rotate an engine shaft; a generator mechanically linked to the engine shaft; an electrical-delivery circuit configured to receive power output from the generator and deliver the power output to a remotely-located electrical motor; and, the motor mechanically connected to a thruster oriented to propel the aircraft, the thruster being substantially displaced from and mechanically independent of the engine shaft.

(B2) In the system denoted as (B1), the engine shaft is transverse with respect to an axis of rotation of the thruster.

(B3) In any of the systems denoted as (B1) through (B2), an exhaust conduit configured to expel post combustion products from the engine located in a space inside the aircraft and deliver the products to a location outside the aircraft.

(C1) A method of equipping an aircraft for propulsion, the method comprising: installing an engine at a first location in the aircraft such that an axle of the engine is nonparallel relative to a roll axis of the aircraft; providing a thrust-creating device at a remote, second location, the thrust creating device establishing a rotational axis; positioning and installing the thrust-creating device such that the rotational axis is substantially parallel to a longitudinal axis of the aircraft; and, connecting an energy output of the engine to a motor mechanically coupled to the thrust-creating device to power the thrust-creating device.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for an aircraft, the aircraft having a roll axis, a seating area in a cabin area of the fuselage having first and second laterally-extending wings, a first thrust-creating device on one side of the aircraft, the first thrust-creating device having a first rotational axis, a second thrust-creating device located on another side of the aircraft, the second thrust-creating device having a second rotational axis, the first and second thrust-creating devices together configured to propel the aircraft, and a fuel-consuming engine located at or in front of the cabin area of the fuselage, the engine creating rotation into an engine shaft, the system comprising:

an energy-conversion device located in the fuselage, the energy-conversion device configured to receive a rotating shaft from the engine located at or in front of the cabin area of the fuselage, the energy-conversion device then creating a transmittable form of converted energy;

an electronics system configured to receive the converted energy and split the converted energy between both a first motor and a second motor;

the first motor configured to rotate the first thrust-creating device in a first axis of rotation using the form of converted energy, the first motor being substantially axially aligned with the first axis of rotation;

the second motor configured to rotate the second thrust-creating device in a second axis of rotation using the form of converted energy, the second motor being substantially axially aligned with the second axis of rotation; and an axis of the engine shaft being nonparallel relative to the first rotational axis of the first thrust-creating device and the second rotational axis of the second thrust-creating device.

2. The system of claim 1 wherein the energy-conversion device is a generator, and the form of converted energy is electrical power.

3. The system of claim 2 wherein the generator is one of a: (i) Permanent Magnet Synchronous Machine (PMSM) generator; (ii) a Hybrid Excitation Synchronous Machine (HESM) generator; (iii) a Field Excited Synchronous Generator (FESG); and, (iv) an Induction Generator (IG).

4. The system of claim 2 wherein the engine and the energy-conversion device are located in the fuselage, and the axis of the energy-conversion device is in line with the shaft from the engine thus also being non-parallel relative to the first rotational axis of the first thrust-creating device and the second rotational axis of the second thrust-creating device.

5. The system of claim 1 wherein the engine and the energy-conversion device are located behind the seating area.

6. The system of claim 1 wherein the engine and the energy-conversion device are located in front of the seating area.

7. The system of claim 1 wherein one of the engine and the energy-conversion device is located in a space defined at least partially underneath at least one seat in the seating area.

8. The system of claim 1 wherein the first and second motors are hydraulic motors which power the first and second thrust-creating devices and the converted energy is a driven fluid.

9. The system of claim 1 wherein the first and second thrust-creating devices are located in symmetrically opposite positions spaced apart from the fuselage on each side of the aircraft.

10. The system of claim 9 wherein the engine shaft is substantially normal to both the first rotational axis of the first thrust-creating device, and the second rotational axis of the second thrust-creating device.

11. The system of claim 10 wherein the engine shaft is substantially displaced relative to, and completely mechanically disconnected from each of the first and second thrust-creating devices.

12. The system of claim 11 wherein at least one of the first and second thrust-creating devices are mounted onto a wing of the aircraft on a support.

13. The system of claim 1 wherein the thrust-creating devices are either propellers or a ducted fans.

14. The system of claim 1 wherein the engine shaft and an axis of rotation for the energy-conversion device are in line, and both are transverse to the roll axis of the aircraft.

15. The system of claim 1 wherein the first thrust-creating device rotates on the same axis as does the first motor, and the second thrust-creating device rotates on the same axis as the second motor.

16. A system for an aircraft, the aircraft having a roll axis, the system comprising:
- a fuel-consuming engine located at or in front of a cabin area along the length of the aircraft, the engine configured to rotate an engine shaft;
- a generator located in a fuselage of the aircraft, the generator mechanically linked to the engine shaft;
- an electrical-delivery circuit configured to receive power output from the generator, store energy in a battery, and deliver the power output to a plurality of remotely-located electrical motors via independent conduits; and
- the motors each mechanically connected to thrusters oriented to propel the aircraft, each thruster being substantially displaced from and mechanically independent of the engine shaft, and each thruster being symmetrically spaced apart from and on opposite sides of the fuselage of the aircraft.

17. The system of claim 16 wherein the engine shaft is transverse with respect to an axis of rotation of each of the thrusters.

18. The system of claim 16 comprising:
- an exhaust duct configured to expel post combustion products from the engine, the engine being located in a space inside the fuselage, the exhaust duct configured to deliver the products to a location outside the fuselage through an exhaust port formed into an exterior skin of the aircraft.

19. A method of equipping an aircraft for propulsion, the method comprising:
- installing an engine into a fuselage of the aircraft at a first location in the aircraft at or in front of the cabin area of the aircraft such that an axle of the engine is substantially transverse relative to a roll axis of the aircraft;
- configuring the engine to receive a source of air for use in combustion;
- ducting an engine exhaust system to release combusted products outside the aircraft through an aircraft skin;
- providing a thrust-creating device at a remote, second location, the thrust creating device establishing a rotational axis;
- positioning and installing the thrust-creating device such that the rotational axis is substantially parallel to a longitudinal axis of the aircraft; and
- electrically connecting an energy output of the engine to a motor which is mechanically coupled to the thrust-creating device to power the thrust-creating device, the motor being mechanically disconnected from the engine.

20. The method of claim 19 comprising:
- incorporating the engine into a seating arrangement in the cabin of the aircraft.

21. The method of claim 19 comprising:
- incorporating the engine into a relatively central location of the aircraft, thus minimizing impact on center of gravity.

* * * * *